Dec. 26, 1950 W. T. BLAKE 2,535,778
HYDRAULIC CONTROL FOR MECHANISMS
Filed June 11, 1946
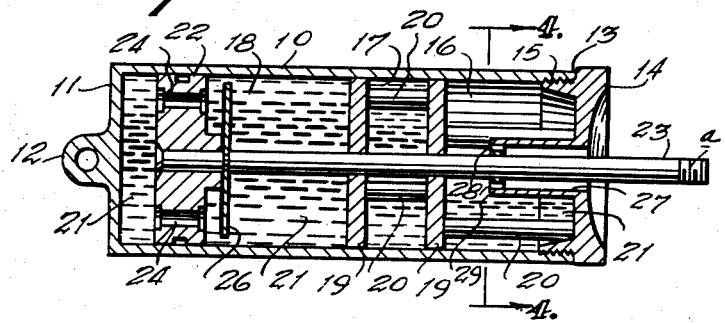
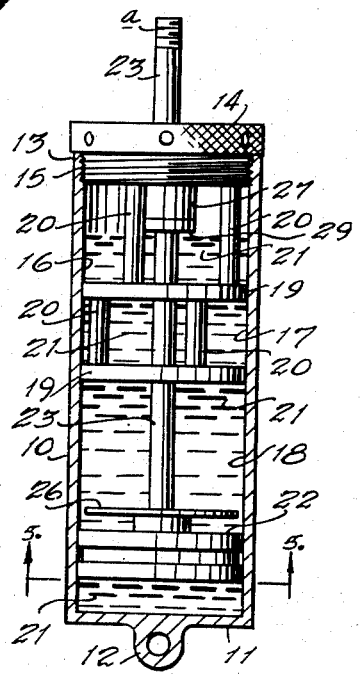
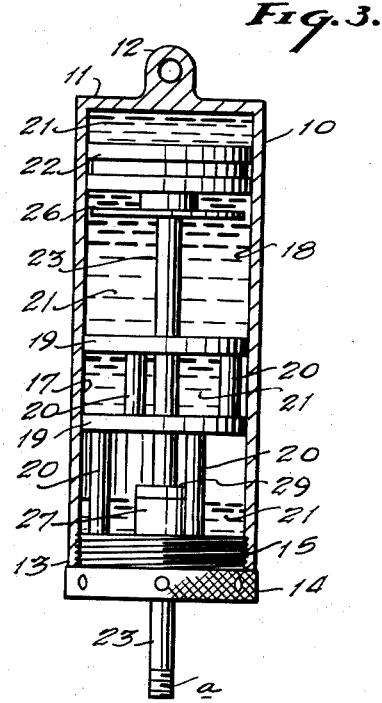
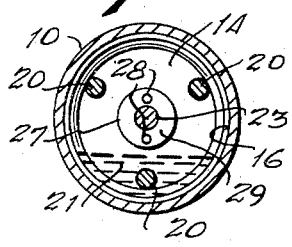
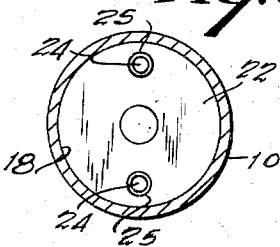
WILLIAM T. BLAKE
INVENTOR.
BY
ATTORNEY Patented Dec. 26, 1950

2,535,778

UNITED STATES PATENT OFFICE 2,535,778

HYDRAULIC CONTROL FOR MECHANISMS

William T. Blake, Fort Worth, Tex.

Application June 11, 1946, Serial No. 675,954

5 Claims. (Cl. 188—96)

This invention relates to hydraulic controlling or governing devices for mechanisms and it has particular reference to cushioning devices commonly referred to as dash pots, air controls, and the like, and its principal object resides in the provision of a mechanism which is especially adaptable to use in adding machines, bookkeeping machines, and the like, in which speed control devices are essential to their smooth and efficient operation and insure a minimum of fluid loss and difficulties arising from the presence of air in the hydraulic fluid employed in the device and prevent the occurrence of a vacuum in the working chamber.

Another object of the invention is manifest in the provision of a novel arrangement of parts which affords positive operation at all times to prevent excess shock on fast moving mechanisms while capable of sufficient flexibility to insure the proper function of such mechanisms and embodying features of design which minimize the necessity for maintenance and care.

Broadly, the invention seeks to comprehend the provision of a simple, compact mechanism in which is arranged a plurality of sealed fluid compartments capable of retaining the hydraulic actuating fluid in operation and preventing the ingress of air or the occurrence of vacuum regardless of the position of the invention.

While the foregoing objects are paramount, other and lesser objects will become manifest as the description proceeds, taken in connection with the appended drawings wherein:

Figure 1 is a longitudinal cross-sectional view of the invention shown in horizontal position and illustrating the fluid in the several chambers.

Figure 2 illustrates the invention in upright position and shows the internal parts in elevation while the cylinder is illustrated in longitudinal section and shows the fluid level in the upper chamber.

Figure 3 shows the invention inverted and illustrates the internal parts in elevation while the cylinder is shown in longitudinal section and shows the fluid level in the lowermost chamber.

Figure 4 is a lateral sectional view of the invention, taken on lines 4—4 of Figure 1, illustrating the orifices in the well in the cap, and Figure 5 is another lateral sectional view, taken on lines 5—5 of Figure 2, showing an operative surface of the piston.

It is the primary purpose of the invention to provide a control device for such mechanisms as bookkeeping and other calculating or business machines, but it is equally desirable to afford apparatus capable of effective control of any type of mechanism requiring a cushioning action, or check, and the invention may well serve the purpose of shock absorbers for motor vehicles, or the like. It is not intended, therefore, that its field of usefulness be limited in any manner.

Accordingly, therefore, the invention comprises a cylinder 10, of conventional design, having one end 11 closed. There may be means associated with the closed end 11 of the cylinder 10, such as the integral apertured boss 12, for connecting the same to the controlled mechanism in some manner, as by a linkage (not shown). The opposite end 13 of the cylinder 10 is open and is provided with a suitable arrangement for securing a cap 14 thereto as by the threads 15 formed internally of the open end 13 of the cylinder 10.

A plurality of chambers or compartments 16, 17 and 18 are formed in the cylinder 10 by spaced disks or circular partitions 19, which are illustrated in the drawings as being secured by spacers 20 to the cap 14. Any other suitable means for fixedly retaining these disks 19 may be provided, however, as by retaining screws arranged through the cylinder wall, or other devices.

It is important that the disks 19 closely engage the inner walls of the cylinder 10 to insure a fluid-tight seal therearound and prevent the fluid 21 from migrating between the chambers and to prevent the passage of air. The spacers 20 may comprise integral posts, as illustrated, or any other suitable device which will permit the free movement of the fluid to all parts of the chambers.

As apparent in Figures 1, 2 and 3 the chamber 18, in the closed end of the cylinder 10, has no outlet for the fluid 21 and a piston 22 is operatively arranged therein. The piston 22 is of conventional design and has a stem 23 arranged through each of the disks 19 and the cap 14 and its outer end is threaded at a for convenient attachment of a lever thereto (not shown). Obviously, the stem 23 should fit closely in the disks 19 to insure the minimum of fluid passage therearound. It may be desirable to employ some type of packing for this purpose as well as about the peripheries of the disks 19. Such a requirement, however, would depend upon the use to which the invention is applied.

The piston 22 is provided with orifices 24 to permit the passage of fluid thereby in its travel in the chamber 18. Palpably, the size of the orifices will govern the speed of the piston 22 and provision can be made for varying these by affording changeable ferrules 25 which can be threaded into the apertures in the piston 22. A circular baffle 26 is attached to the stem 23 and spaced from the piston 22 to retard the passage of fluid 21 through the orifices 24. The size of the baffle 26 and its spacing from the piston 22 may vary according to individual requirements.

The cap 14 is formed with a well 27 extending interiorly of the cylinder 10, as shown particularly in Figure 1, and has a plurality of orifices or vents 28 at its bottom 29. The vents 28 open into the chamber 16 adjacent to the cap 14 and admits air thereto. The purpose of the well 27 is that of providing a retention for the fluid 21 against leakage through the cap 14 about the stem 23 regardless of the position in which the cylinder 10 is arranged, as depicted in Figures 1, 2 and 3.

The cylinder 10 is filled with fluid 21 to a level just below the lower end 29 of the well 27, when in upright position as shown in Figure 2, and, by reason of the predetermined spacing of the disks 19 from the cap 14 and the depth of the well 27, it is impossible for the fluid 21 to escape from the chamber 16 through the orifices 28 in any position of the invention.

The chambers 17 and 18 remain completely filled with fluid and are sealed against air intake or loss of fluid by the closely fitting disks 19. The fluid in the chamber 16, being subject only to atmospheric pressure, serves to aid in creating a seal for the chambers 17 and 18 and a reservoir for the fluid 21, particularly when employed in the position shown in Figure 2. The central chamber 17 is filled with an inert body of fluid which, except for expansion due to varying temperatures, completely seals the working chamber 18.

By providing the inert body of fluid in the chamber 17 no fluid can escape from the working chamber 18 on the upstroke of the piston 22 and thus no vacuum can occur below the piston to affect or disturb its function as in devices of conventional design. The very negligible displacement of the stem 23 in the working chamber 18 does not produce a vacuum sufficient to affect the operation of the piston 22 to any noticeable degree.

It is contemplated that certain changes and modifications may be resorted to by persons skilled in the art without departing from the spirit of the invention or the scope of the appended claims.

What is claimed is:

1. In a governing device for hydraulically controlled mechanisms, in combination with a cylinder integrally closed at one end and having a piston operating therein and a cap detachably secured to the open end of said cylinder, a plurality of partitions arranged in said cylinder transverse to the longitudinal axis thereof and spaced successively from said cap providing a sealed fluid chamber therein for said piston toward its closed end, a stem for said piston operatively arranged through said partitions and said cap and means comprising an annular well formed interiorly of said cap embracing said stem and having perforations in its inner end, said means being arranged to prevent escape of fluid below a predetermined level from said cylinder while admitting air thereinto in varying positions.

2. In a hydraulic governing device for controlling mechanical action, in combination, a cylinder having one end closed and a removable cap on its opposite end, a piston operatively arranged in said cylinder having a stem operating through said cap, a plurality of spaced partitions in one end of said cylinder surrounding said stem and providing a closed fluid compartment for said piston and at least one closed fluid compartment adjacent thereto toward said cap, venting means formed with said cap comprising a well extending into said cylinder and surrounding said stem, said well preventing escape of fluid below a predetermined level from said cylinder in any position.

3. In a hydraulic device for controlling action in mechanisms, in combination, a cylinder having a closed end and a cap detachably secured at its opposite end, a piston operating in said cylinder having a stem arranged through said cap, a plurality of spaced partitions in said cylinder embracing said stem providing a sealed fluid compartment enclosing said piston and at least one sealed fluid compartment adjacent thereto toward said cap, a fluid compartment formed by one of said partitions adjacent to said cap and a vented well formed with said cap and extending into its adjacent compartment around said piston stem preventing escape of fluid below a predetermined level from said cylinder in any position thereof.

4. In a hydraulic device for controlling action in mechanisms, in combination with a cylinder closed at one end and having a detachable cap on its opposite end, a plurality of spaced partitions arranged transversely of said cylinder defining at least two sealed fluid chambers therein, a piston operating in one of said chambers and having a stem extending through each of said partitions and said cap, a fluid chamber formed adjacent to said cap, and vented means formed on said cap and extending into its said fluid chamber retaining fluid below a predetermined level in the latter in any position of said cylinder.

5. In a hydraulic governing device for controlling mechanical action, in combination, a cylinder having one end closed and a cap detachably secured to its opposite end, a plurality of spaced disks removably arranged in said cylinder defining at least two sealed fluid chambers therein and a vented fluid chamber adjacent to said cap, a piston operating in one of said sealed chambers having a stem operatively arranged through each of said disks and said cap, and vented means formed with said cap extending into said vented chamber preventing escape of fluid below a predetermined level therefrom in any position of said chamber.

WILLIAM T. BLAKE.

REFERENCES CITED

The following references are of record in the file of this patent:

UNITED STATES PATENTS

| Number | Name | Date |
| --- | --- | --- |
| 2,071,701 | Mejian | Feb. 23, 1937 |
| 2,266,691 | Mercier | Dec. 16, 1941 |